No. 834,015. PATENTED OCT. 23, 1906.
A. H. MARKS.
RUBBER TIRE.
APPLICATION FILED NOV. 17, 1905.
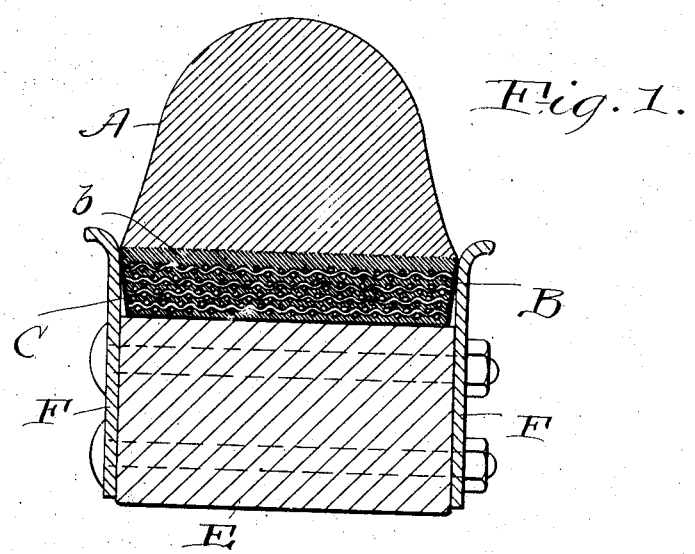
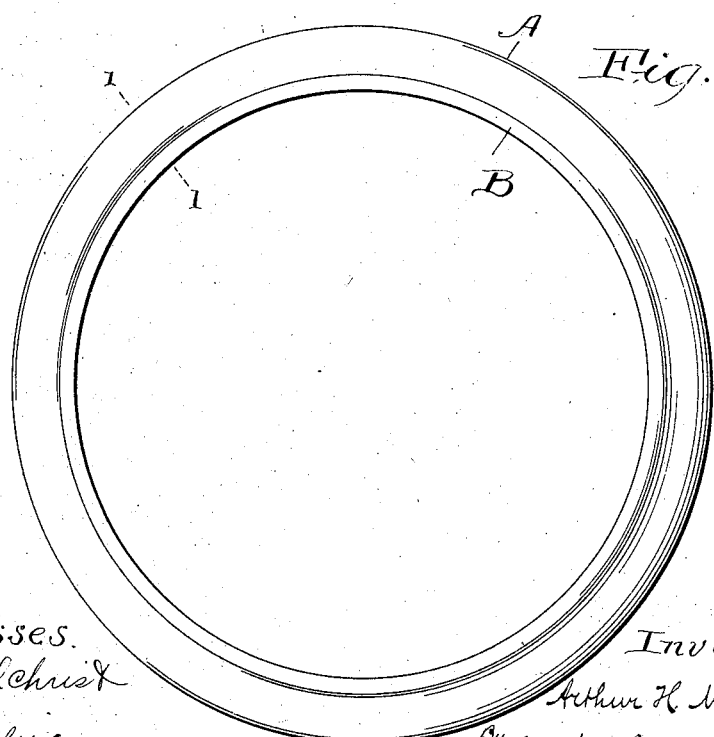
Witnesses.
E. B. Gilchrist
H. B. Sullivan
Inventor
Arthur H. Marks
By Thurston Bates & Woodward
Attorneys

UNITED STATES PATENT OFFICE.

ARTHUR H. MARKS, OF AKRON, OHIO, ASSIGNOR TO THE DIAMOND RUBBER COMPANY, OF AKRON, OHIO, A CORPORATION OF OHIO.

RUBBER TIRE.

No. 834,015.  Specification of Letters Patent.  Patented Oct. 23, 1906.

Application filed November 17, 1905. Serial No. 287,843.

*To all whom it may concern:*

Be it known that I, ARTHUR H. MARKS, a citizen of the United States, residing at Akron, in the county of Summit and State of Ohio, have invented a certain new and useful Improvement in Rubber Tires, of which the following is a full, clear, and exact description, reference being had to the accompanying drawings.

Rubber tires for vehicle-wheels are subjected to very severe strains in use, and as such tires have been made heretofore they wear out far too rapidly to satisfy users.

Vulcanized rubber tires when held on the rim by wires or metal bands which are not embedded in the rubber before it is vulcanized are the least durable, because immediately their use is begun a chafing of the rubber upon the metal begins, due to the movement of the rubber under the strains of use, and this chafing results in rapid destructive wear of the rubber tires. Those forms of rubber tires in which wires or wire fabric for strengthening them are embedded before vulcanization and to which therefore the rubber becomes attached during the process of vulcanization are the most durable; but even with these tires as heretofore constructed the strains of use will sooner or later loosen the rubber from the wires, whereupon the same relative movement begins and the same chafing and destructive wear results.

The tire embodying the present invention, as hereinafter described, is the resultant of many experiments carried on for the purpose of discovering means for minimizing and, if possible, eliminating said destructive action without reducing the resiliency of the tire as a whole.

The invention consists of a tire having a tread portion made of resilient vulcanized rubber and a base portion made up of alternate layers of woven-wire fabric and vulcanized rubber, which is much firmer and less resilient than the rubber of which the tread is made, (said rubber in the base being extended through, so as to fill the interstices of the wire fabric,) and a substantial zone of rubber which is firmer and less resilient than the tread portion, which zone is vulcanized between the tread portion and that part of the rubber of the base in which said wire fabric is embedded, as described.

In the drawings, Figure 1 is a transverse sectional view of the improved tire in which the invention is embodied, and Fig. 2 is a side view of the tire complete.

Referring to the parts by letters, A represents the tread portion of the tire, which may be of any desired shape and may be made of any resilient rubber compound—such, for example, as is commonly used in the construction of rubber tires. The base B of the tire is made of rubber, which when vulcanized is very much firmer, tougher, and less resilient than the tread, and in this base are embedded a plurality of layers of open-work metal, preferably, of course, woven-wire fabric C. The base is built up of alternate plies of the unvulcanized rubber, and the wire fabric and the rubber is by pressure caused to flow into and fill the interstices of the fabric. Between this base, made up, as stated, of rubber which has comparatively little resiliency and the stiffening wire fabric embedded therein, there is a zone b, of rubber, which is less resilient than the rubber of the tread. It may be the same in quality as the rubber of which the base is made; but the base because it is stiffened by the wire fabric is practically non-resilient, while this zone b, being not stiffened by the wire fabric, has enough resiliency to enable it to serve the important purpose of absorbing the movement of the tread portion resulting from the strains of use.

It is difficult, if not impossible, to express by mere words the precise degree of resiliency of the various parts of the described tire. In fact, it is not desired to definitely limit the invention to any particular degrees of resiliency, as a wide variation in that regard is permissible. Speaking generally, the base rubber should have so little resiliency that when reinforced by the wire fabric the base as a whole becomes practically non-resilient. The tread portion may be as resilient as desired. The zone b should be of such thickness and have such degree of resiliency that it will absorb without transmitting it to the base portion the movement of the tread portion. Practically the desired results may be attained by using for the tread portion a rubber compound containing about six per cent. of sulfur, while the rubber for the base portion and for the zone b may contain about twelve per cent. of sulfur and about five per cent. of oxid of iron, and the zone may be from one-sixteenth to a quarter of an inch thick. When a tire so made up has been vulcanized from three to four hours, the various parts thereof will be found to have the degree of resiliency required to make a wonderfully durable and satisfactorily resilient tire.

Fig. 1 of the drawings shows a convenient way of holding the tire, which when completed is an annulus upon the wheel-felly E. The means consists of two plates F, secured to opposite faces of the felly and extending outward against the sides of the tire.

The tire above described is of course constructed of unvulcanized rubber, and all of the parts thereof become firmly united during vulcanization. The resiliency of the tread portion and of the firmer rubber in the zone b immediately adjacent to their plane of union will have their resilient qualities slightly modified during vulcanization by reason of their juxtaposition, whereby there will be no abrupt transition in resilient qualities between them.

Having thus described my invention, I claim—

A rubber tire composed of a tread portion made of resilient rubber, a base portion made of firmer and less resilient rubber, in which a plurality of plies of open-work metal fabric is embedded, and a substantial zone of rubber of less resiliency than the tread, which is vulcanized between the tread and the base.

In testimony whereof I hereunto affix my signature in the presence of two witnesses.

ARTHUR H. MARKS.

Witnesses:
E. L. THURSTON,
N. L. BRESNAN.